(12) United States Patent
Koc (10) Patent No.: US 7,688,918 B2
(45) Date of Patent: Mar. 30, 2010

(54) RECURSIVE PHASE ESTIMATION FOR A PHASE-SHIFT-KEYING RECEIVER

(75) Inventor: Ut-Va Koc, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 864 days.

(21) Appl. No.: 11/483,280

(22) Filed: Jul. 7, 2006

(65) Prior Publication Data

US 2008/0008268 A1    Jan. 10, 2008

(51) Int. Cl.
   *H04L 27/22* (2006.01)
(52) U.S. Cl. ............... 375/329; 375/279; 329/304; 398/206
(58) Field of Classification Search ............ 375/295, 375/326, 329, 279; 329/304; 398/206
   See application file for complete search history.

(56) References Cited

U.S. PATENT DOCUMENTS

| | | | |
|---|---|---|---|
| 4,691,176 A * | 9/1987 | Hsiung et al. .................. 331/2 |
| 4,732,447 A | 3/1988 | Wright et al. ............ 350/96.16 |
| 5,077,531 A | 12/1991 | Takeuchi et al. ............ 329/304 |
| 5,515,197 A | 5/1996 | Hooijmans et al. .......... 359/189 |
| 6,038,267 A | 3/2000 | Oura et al. .................. 375/329 |
| 6,473,222 B2 | 10/2002 | Hait et al. .................. 359/326 |
| 7,039,131 B2 * | 5/2006 | Banerjea ..................... 375/326 |
| 7,266,310 B1 | 9/2007 | Savory et al. ............... 398/205 |

(Continued)

FOREIGN PATENT DOCUMENTS

EP    0 451 289 A1    10/1991

(Continued)

OTHER PUBLICATIONS

"Digital Coherent Quadrature Phase-Shift-Keying (QPSK)", by U. Koc et al., OThI1.pdf, Optical Society of America, 2006, 3 pages.

(Continued)

*Primary Examiner*—Temesghen Ghebretinsae
(74) *Attorney, Agent, or Firm*—Mendelsohn, Drucker & Associates, P.C.; Yuri Gruzdkov; Steve Mendelsohn (57) ABSTRACT

In one embodiment, a receiver of the invention has a detector coupled to a digital processor. The detector is adapted to mix the received PSK signal with a local oscillator (LO) signal having a time-varying phase offset with respect to the carrier frequency of the PSK signal to produce a digital measure of the PSK signal. The digital processor is adapted to: (i) estimate a frequency offset between the carrier frequency of the PSK signal and the LO signal; (ii) remove from an angular component of the digital measure a component corresponding to the frequency offset to generate a frequency-offset-adjusted signal; (iii) for each time slot of the PSK signal, estimate the phase of a respective PSK constellation symbol based on an angular component of the frequency-offset-adjusted signal and an angular component of a recursive function; (iv) estimate a phase differential for a PSK-symbol transition based on two consecutive phase estimates; (v) map each estimated phase differential onto a phase increment corresponding to a symbol transition in the PSK constellation; and (vi) recover a data sequence encoded in the PSK signal based on the mapping results.

19 Claims, 6 Drawing Sheets

U.S. PATENT DOCUMENTS

| | | | |
|---|---|---|---|
| 7,327,913 B2 | 2/2008 | Shpantzer et al. | 385/15 |
| 2001/0017898 A1* | 8/2001 | Raheli et al. | 375/262 |
| 2002/0122509 A1* | 9/2002 | Mueller et al. | 375/341 |
| 2005/0111530 A1* | 5/2005 | Chen et al. | 375/150 |
| 2005/0243952 A1* | 11/2005 | Li | 375/343 |
| 2005/0265485 A1* | 12/2005 | Robinson | 375/322 |
| 2006/0002490 A1* | 1/2006 | Neubauer et al. | 375/316 |
| 2006/0013296 A1* | 1/2006 | Carrer et al. | 375/232 |
| 2006/0067431 A1* | 3/2006 | Steinbach | 375/326 |
| 2006/0093079 A1* | 5/2006 | Kim et al. | 375/344 |
| 2006/0093081 A1* | 5/2006 | Ibrahim et al. | 375/354 |
| 2006/0193401 A1* | 8/2006 | Lopez Villegas et al. | 375/326 |
| 2006/0209982 A1* | 9/2006 | De Gaudenzi et al. | 375/279 |
| 2007/0092259 A1 | 4/2007 | Bontu et al. | 398/147 |
| 2007/0211831 A1* | 9/2007 | Wilhelmsson | 375/329 |
| 2007/0253512 A1* | 11/2007 | Lawrow et al. | 375/326 |
| 2008/0075472 A1* | 3/2008 | Liu et al. | 398/202 |
| 2008/0170862 A1* | 7/2008 | Vassilieva et al. | 398/152 |
| 2008/0232815 A1* | 9/2008 | Shioiri et al. | 398/140 |
| 2008/0267637 A1* | 10/2008 | Calabro | 398/203 |
| 2009/0034635 A1* | 2/2009 | Von Elbwart et al. | 375/260 |

FOREIGN PATENT DOCUMENTS

| | | |
|---|---|---|
| GB | 2 259 419 A | 3/1993 |

OTHER PUBLICATIONS

"Coherent Demodulation of 40-Gbit/s Polarization-Multiplexed QPSK Signals with 16-GHz Spacing after 200-km Transmission" by Satoshi Tsukamoto et al., PDP29, Optical Society of America, 2005, XP-010833521, 3 pages.

"Direct Least Squares Fitting of Ellipses", by Andrew W. Fitzgibbon et al., IEEE Transactions on Pattern Analysis and Machine Intelligence, vol. 21, No. 5, 1999, pp. 476-480.

"Coherent Optical QPSK Intradyne System: Concept and Digital Receiver Realization," by Frowin Derr, Journal of Lightwave Technology, vol. 10, No. 9, Sep. 1992, pp. 1290-1296.

"Significant Performance Advantage of Electroabsorption Modulator Integrated Distributed Feedback Laser (EML) Transmitter in Transporting Multicarrier QAM Signals," by Naresh Chand, et al., Journal of Lightwave Technology, vol. 19, No. 10, Oct. 2001, pp. 1462-1468.

"Phase Noise-Tolerant Synchronous QPSK/BPSK Baseband-Type Intradyne Receiver Concept With Feedforward Carrier Recovery," by Noe, R., Journal of Lightwave Technology, vol. 23, No. 2, pp. 802-808, Feb. 2005.

"PLL-Free Synchronous QPSK Polarization Multiplex/Diversity Receiver Concept With Digital I&Q Baseband Processing," by Noe, R., IEEE Photonics Technology Letters, vol. 17, No. 4, pp. 887-889, Apr. 2005.

"Numerically Stable Direct Least Squares Fitting of Ellipses," by Halir, R. et al., Department of Software Engineering, Charles University, Malostranske nam. 2/25, 118 00 Prague, Czech Republic, 8 pages, 2006.

"Coherent Detection Method Using DSP for Demodulation of Signal and Subsequent Equalization of Propagation Impairments," by Taylor, Michael G., IEEE Photonics Technology Letters, vol. 16, No. 2, pp. 674-676, Feb. 2004.

U.S. Appl. No. 10/204,607, filed Aug. 15, 2005, Chen et al.

"Unrepeated optical transmission of 20 Gbit/s quadrature phase-shift keying signals over 210 km using homodyne phase-diversity receiver and digital signal processing," by Ly-Gagnon, D.-S. et al., Electronics Letters, vol. 41, No. 4, 2 pages, Feb. 17, 2005.

* cited by examiner

RECURSIVE PHASE ESTIMATION FOR A PHASE-SHIFT-KEYING RECEIVER

BACKGROUND OF THE INVENTION

1. Field of the Invention

The present invention relates to communication equipment and, more specifically, to equipment for coherent detection of phase-shift-keying (PSK) signals.

2. Description of the Related Art

Delivery of multimedia services (e.g., telephony, digital video, and data) that is implemented using optical phase-shift keying (PSK) signals has certain advantages, e.g., over that implemented using conventional electrical analog or digital signals. More specifically, some of the advantages are: the ability to carry various/multiple multimedia services over the same optical communication channel; the ability to maintain a selected bit-error rate (BER) with relatively low carrier-to-noise ratios; relatively high tolerance to nonlinear signal distortions; and relatively high spectral efficiency and transmission capacity. As a result, cable companies are upgrading their hybrid fiber coaxial (HFC) networks to improve/create a fully interactive, bidirectional optical network that can carry optical multimedia signals into and out of homes. It is projected that, in the near future, high-definition television (HDTV) signals are likely to be delivered substantially exclusively over optical communication channels.

A typical coherent optical PSK receiver detects the received optical communication signal by mixing it with a local oscillator (LO) signal and processing the mixing results to determine the phase of the communication signal in each time slot, thereby recovering the encoded data. To enable this phase determination, the LO signal is typically phase-locked to the carrier wavelength of the communication signal using an optical phase-lock loop (PLL). More specifically, the PLL is configured to track the frequency and phase of the carrier wavelength and provide a feedback signal to the LO source, based on which feedback signal the LO source achieves and maintains the phase-lock.

Unfortunately, suitable coherent optical receivers are typically relatively difficult to design and/or relatively expensive to build. For example, a conventional, relatively inexpensive laser source might produce an optical signal that has a relatively large linewidth. If that laser source is used in a coherent optical receiver as an LO source, then its relatively large linewidth might produce a phase uncertainty/noise that can make the optical phase-lock between the LO and communication signals difficult to achieve and/or maintain. As a result, coherent optical receivers are often designed to have specially constructed laser sources and/or relatively complex optical PLLs, both of which can drive up the receiver cost by a substantial amount.

SUMMARY OF THE INVENTION

Problems in the prior art are addressed by certain embodiments of a coherent receiver, which is adapted to recover data encoded in a received phase-shift-keying (PSK) signal using a local oscillator (LO) signal that does not have to be phase-locked to the carrier frequency of the PSK signal.

According to one embodiment, the present invention is a receiver for an optical phase-shift-keying (PSK) signal, comprising (A) a detector adapted to mix said PSK signal with an optical local oscillator (LO) signal to produce a digital measure of the PSK signal; and (B) a digital processor being coupled to receive the digital measure from the detector and being adapted to process the digital measure to recover data encoded in the PSK signal by measuring time-varying phase offset between a carrier frequency of the PSK signal and the LO signal, wherein: for each time slot of the PSK signal, the digital processor is adapted to estimate the phase of a respective PSK constellation symbol based on (i) an angular component of the digital measure and (ii) an angular component of a recursive function, said recursive function having a first component calculated based on the digital measure for the current time slot and a second component calculated based on the digital measure for a preceding time slot.

According to another embodiment, the present invention is a method of processing an optical phase-shift-keying (PSK) signal, comprising (A) mixing said PSK signal with an optical local oscillator (LO) signal to produce a digital measure of the PSK signal; and (B) processing the digital measure to measure time-varying phase offset between a carrier frequency of the PSK signal and the LO signal and recover data encoded in the PSK signal, wherein said processing comprises: for each time slot of the PSK signal, estimating the phase of a respective PSK constellation symbol based on (i) an angular component of the digital measure and (ii) an angular component of a recursive function, said recursive function having a first component calculated based on the digital measure for the current time slot and a second component calculated based on the digital measure for a preceding time slot.

In one embodiment, a receiver of the invention has a detector coupled to a digital processor. The detector is adapted to mix the received PSK signal with an LO signal having a time-varying phase offset with respect to the carrier frequency of the PSK signal to produce a digital measure of the PSK signal. The digital processor is adapted to: (i) estimate a frequency offset between the carrier frequency of the PSK signal and the LO signal; (ii) remove from an angular component of the digital measure a component corresponding to the frequency offset to generate a frequency-offset-adjusted signal; (iii) for each time slot of the PSK signal, estimate the phase of a respective PSK constellation symbol based on an angular component of the frequency-offset-adjusted signal and an angular component of a recursive function; (iv) estimate a phase differential for a PSK-symbol transition based on two consecutive phase estimates; (v) map each estimated phase differential onto a increment corresponding to a symbol transition in the PSK constellation; and (vi) recover a data sequence encoded in the PSK signal based on the mapping results. The recursive function has a first component calculated based on the frequency-offset-adjusted signal for the current time slot and a second component calculated based on the frequency-offset-adjusted signal for the immediately preceding time slot, with the second component being weighted by a recursive memory factor. The digital processor can adjust the recursive memory factor to achieve an optimal bit-error rate over a wide range of operating conditions characterized by different relative contributions of linewidth-related phase noise and additive-noise-related phase noise into the total phase noise. Advantageously, a receiver according to certain embodiments of the invention is capable of handling a relatively wide range of operating conditions while relying on a single phase-estimation algorithm, whereas prior-art systems might need to rely on two or more different phase-estimation algorithms, with each of those algorithms only suitable for a corresponding relatively narrow range of operating conditions.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Figure 1:
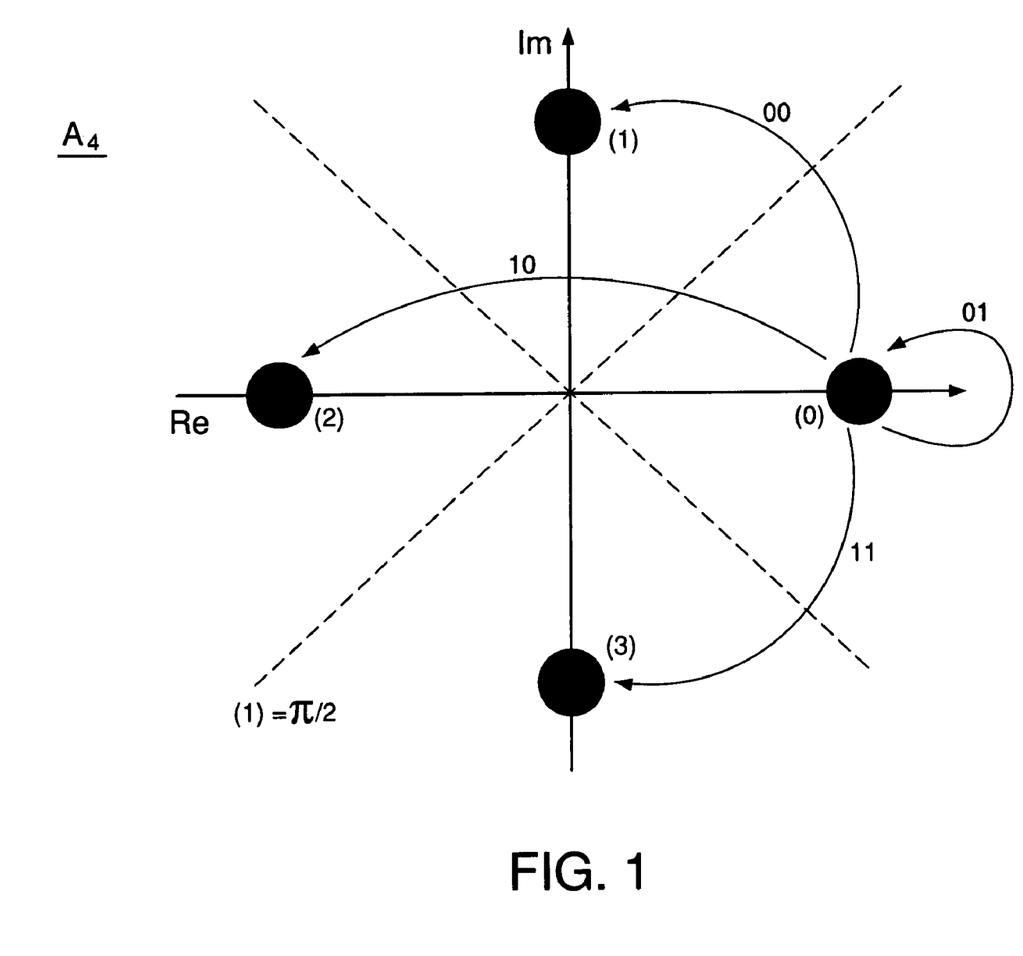
FIG. 1 graphically shows a representative quadrature-phase-shift-keying (QPSK) constellation that can be used in various embodiments of the invention.

FIG. 1 graphically shows a representative quadrature-phase-shift-keying (QPSK) constellation that can be used in various embodiments of the invention. Symbol set $A_4$ of the QPSK constellation has four symbols labeled (0) through (3) that are described by Eq. (1):

$$A_4 = \pm 1, \pm j \qquad (1)$$

where symbols (0) and (2) lie on the real (Re) axis of the complex plane, and symbols (1) and (3) lie on the imaginary (Im) axis of the complex plane. Using the constellation of FIG. 1, data are encoded in a differential manner by assigning a particular two-bit value to each transition between the constellation symbols. The arrows in FIG. 1 illustratively show four possible transitions that involve symbol (0) as a start state, with the assigned binary values indicated next to the respective arrows. For example, the (0)→(1) transition is assigned a binary value of 00. Similarly, the (0)→(2) and (0)→(3) transitions are assigned binary values of 10 and 11, respectively. Finally, the (0)→(0) transition is assigned a binary value of 01. A transition diagram for transitions that originate at any one of symbols (1), (2), and (3) can be obtained by simply rotating the shown transition diagram.

Figure 2:
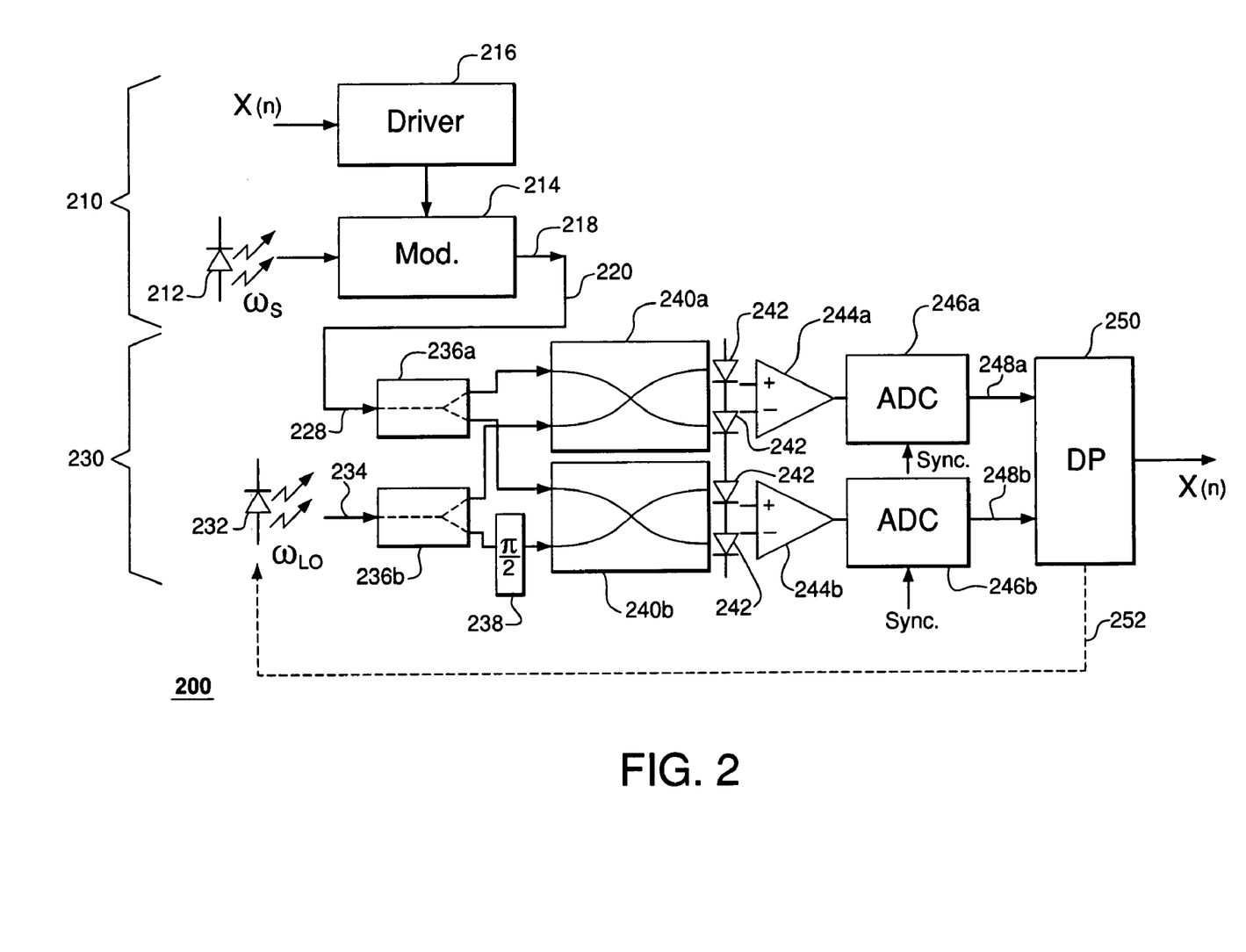
FIG. 2 shows a block diagram of a communication system according to one embodiment of the invention.

FIG. 2 shows a block diagram of a communication system 200 according to one embodiment of the invention. System 200 has a transmitter 210 and a receiver 230 coupled via an optical communication link 220. Transmitter 210 has an optical source (e.g., a laser) 212 coupled to an optical modulator (OM) 214, which is controlled by a driver 216. Driver 216 receives a binary input sequence X(n), transforms it into a sequence of constellation symbols, e.g., using the constellation shown in FIG. 1, and generates a control signal that is applied to OM 214 to produce an optical signal 218 that carries that symbol sequence.

After propagating through link 220, signal 218 is received at receiver 230 as signal 228, which is then split into first and second copies in a splitter 236a. A local oscillator (LO) signal 234, which is produced at receiver 230 by an optical source (e.g., a laser) 232, is similarly split into first and second copies in a splitter 236b. The first copy of signal 228 and the first copy of signal 234 are then applied to an optical mixer 240a. The second copy of signal 228 and a phase-shifted copy of signal 234 are similarly applied to an optical mixer 240b, with the phase-shifted copy of signal 234 obtained from the second copy of signal 234 (produced by splitter 234b) by passing that copy through an optical phase shifter (OPS) 238. In a typical configuration, OPS 238 is configured to introduce a $\pi/2$ (i.e., 90-degree) phase shift. It is desirable for the phase shift introduced by OPS 238 to fall between 45 and 135 degrees, and it is preferred that said phase shift is between 75 and 105 degrees.

Each of optical mixers 240a-b is designed to combine its input signals to produce two interference signals, each having an intensity that is: (i) proportional to the intensities of the input signals and (ii) related to an instant phase offset between those input signals. More specifically, the interference signals produced by optical mixer 240 are such that the intensity difference between these interference signals is proportional to $\cos(\Delta\phi)$, where $\Delta\phi$ is the instant phase offset. A pair of balanced photodetectors 242 coupled to a respective one of differential amplifiers 244a-b continuously measures the intensity difference for the interference signals produced by the respective one of optical mixers 240a-b and applies the measurement results to a respective one of synchronized analog-to-digital converters (ADCs) 246a-b. Using these measurement results, each of ADCs 246a-b produces a respective one of digital signals 248a-b, both of which are applied to a digital processor (DP) 250.

Note that the above-described signal processing implemented in receiver 230 substantially causes digital signal 248a to be proportional to $I_{228} \cos(\Delta\gamma)$, where $I_{228}$ is the instant intensity of signal 228 and $\Delta\gamma$ is the instant phase offset between signals 228 and 234. Note also that, if OPS 238 introduces a $\pi/2$ phase shift, then the signal processing implemented in receiver 230 causes digital signal 248b to be substantially proportional to $I_{228} \sin(\Delta\gamma)$. Thus, the signal processing implemented in receiver 230 substantially provides, in the form of digital signals 248a-b, instant measures of the real and imaginary components, respectively, of signal 228 in the complex plane defined with respect to LO signal 234.

The absence of a phase-lock between the carrier frequency (wavelength) of signal 228 and LO signal 234 generally manifests itself by different instances of the same symbol carried by signal 228 falling onto different portions of the complex plane defined with respect to LO signal 234. More specifically, if a sufficiently large number of instances of the same symbol are received and mapped onto the complex plane, those instances form a substantially continuous circular band centered at the center of coordinates and having a radius corresponding to the distance between the center of coordinates and the symbol position in the constellation. For example, repetitive transmission of symbol (0) of the QPSK constellation (see FIG. 1) will produce a circular band having a radius of one. Similarly, repetitive transmission of symbol (2) of the QPSK constellation will produce a circular band having a radius of one, which circular band will overlap with the circular band corresponding to symbol (0). Repetitive transmission of symbols (1) and (3) of the QPSK constellation will produce two additional overlapping circular bands having a radius of one. One consequence of this band overlapping is that the direct mapping, using digital signals 248a- b, of the received symbols onto the complex plane defined with respect to (not phase-locked) LO signal 234 does not enable appropriate symbol recognition and/or data extraction. As described in more detail below, DP 250 processes digital signals 248a-b such that, even in the absence of a phase-lock between signals 228 and 234, symbol transitions in communication signal 228 are ascertained to enable substantial reconstruction of the original binary sequence X(n).

In certain embodiments of receiver 230, DP 250 is optionally configured to generate a control signal 252 and apply that control signal to optical source 232 for the purpose of loosely controlling the frequency ($\omega_{LO}$) of that optical source. In one embodiment, based on control signal 252, optical source 232 is configured to adjust its frequency, e.g., so that $|\omega_{LO} - \omega_S| \leq \Delta\omega_0$, where $\omega_S$ is the carrier frequency of communication signal 228, and $\Delta\omega_0$ is a selected maximum frequency mismatch value. Keeping the frequency mismatch between signals 228 and 234 within certain bounds might be advantageous because, in the presence of a relatively large frequency mismatch, the magnitudes of the signals generated by photodetectors 242 become relatively low. As such, control signal 252 can help to maintain optimal performance of photodetectors 242. Note, however, that the feedback loop that provides control signal 252 is not designed to phase-lock optical source 232 to the carrier frequency of communication signal 228 (as would be the case in a PLL).

Figure 3:
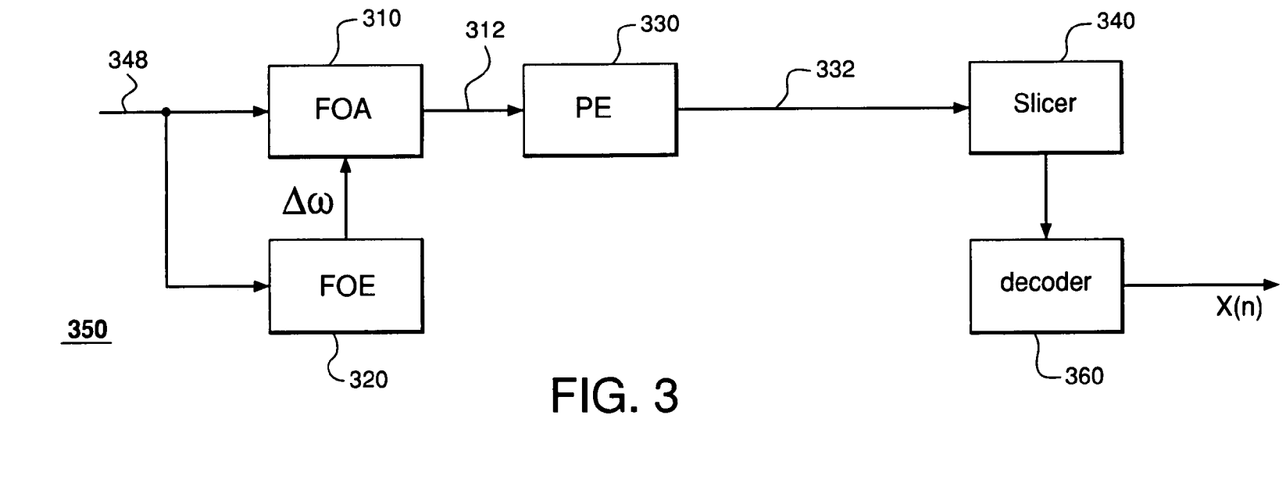
FIG. 3 shows a block diagram of a digital processor (DP) that can be used in the communication system of FIG. 2 according to one embodiment of the invention.

FIG. 3 shows a block diagram of a digital processor (DP) 350 that can be used as DP 250 (FIG. 2) according to one embodiment of the invention. DP 350 is configured to receive a complex digital input signal 348, which is a bus signal having signals 248a-b (see FIG. 2). In one implementation, signal 348 carries the real and imaginary parts of communication signal 228 and can be expressed as follows:

$$y_{348}(t) = E_B(t) e^{j(\Phi_W + \Delta\omega t)} + N(t) \quad (2)$$

where: $y_{348}(t)$ is the complex value of signal 348 at time t;

$$E_B(t) = \sum_n A_B(n) p(t - nT),$$

where $A_B(n)$ is the respective constellation symbol (e.g., from constellation $A_4$ of FIG. 1) in the n-th time slot, p(t) is the waveform envelope associated with each constellation symbol, and T is the symbol period (time-slot duration); $\Phi_W = \Phi_S + \Phi_{LO}$, where $\Phi_S$ is the linewidth-related phase noise in the communication signal (e.g., signal 228) and $\Phi_{LO}$ is the linewidth-related phase noise in the LO signal (e.g., signal 234); $\Delta\omega = \omega_{LO} - \omega_S$, and N(t) is the additive complex Gaussian noise composed of optical, thermal, and shot noise of various system components.

Signal 348 is applied to a frequency offset adjustor (FOA) 310 and a frequency offset estimator (FOE) 320. FOE 320 is configured to compute and track the value of $\Delta\omega$, e.g., as described in more detail below, and provide the computed value to FOA 310. Based on the value of $\Delta\omega$ received from FOE 320, FOA 310 adjusts the phase of signal 348 by multiplying it by $\exp(-j\Delta\omega t)$ and generates a frequency-offset-adjusted signal 312, which, using Eq. (2), can be expressed as follows:

$$y_{312}(t) = E_B(t) e^{j\Phi_W} + N'(t) \quad (3)$$

where: $y_{312}(t)$ is the complex value of signal 312 at time t. Taking into account that, for QPSK, $E_B(n) = r_0 \exp j\theta_B(n)$, where $\theta_B = k\pi/2$, k=0, 1, 2, 3; $r_0$ is the signal magnitude; and n is the index corresponding to the time slot number, and changing the notation from time t to index n, Eq. (3) can be transformed into:

$$y(n) \equiv y_{312}(nT) = r_0 e^{j[\theta_B(n) + \Phi_W(n)]} + N(n) \quad (4)$$

To correctly decode the data encoded in signal 312, the subsequent processing of that signal in DP 350 aims at extracting phase increment $\Delta\theta(n)$, which is expressed as follows:

$$\Delta\theta(n) = \theta_B(n) - \theta_B(n-1) \quad (5)$$

A phase estimator (PE) 330, which receives signal 312, is configured to estimate, for each symbol period, the value of $\theta_B(n)$ as described in more detail below. The estimated value of $\theta_B(n)$ is then applied to a slicer 340, which is configured to map each received estimate onto one of the phases of the symbols on the constellation map (see FIG. 1). Slicer 340 can use conventional mapping techniques to accomplish this mapping.

The stream of mapping results generated by slicer 340 is applied to a decoder 360, which is configured to recover from that stream the original bit sequence X(n) (see also FIG. 2). More specifically, decoder 360 uses the received mapping results to determine $\Delta\theta(n)$ in accordance with Eq. (5). Decoder 360 then converts the determined value of $\Delta\theta(n)$ into a corresponding binary value assigned to a set of symbol transitions of the QPSK constellation shown in FIG. 1 having the requisite phase increment value. Note that the differential nature of the encoding algorithm makes it unnecessary to determine the exact QPSK symbols carried by the communication signal because the encoded data can unequivocally be recovered by correctly ascertaining only the respective phase increments for each QPSK-symbol pair, and not the exact QPSK-symbol pair that produced those increments.

Turning now to the processing implemented in PE 330, we note first that the two sources of noise in signal 312, i.e., linewidth-related phase noise $\Phi_W(n)$ and additive noise N(n), affect that signal in different ways (see Eq. (4)). Since the relative contributions of the linewidth-related phase noise and the additive noise into the total phase noise may vary, communication system 200 may need to use two or more different phase-estimation algorithms to adequately handle that variability. For example, U.S. patent application Ser. No. 11/204,607, filed on Aug. 15, 2005, which is incorporated herein by reference in its entirety, discloses a phase-estimation algorithm that works relatively well for a system whose phase noise is dominated by the linewidth-related phase noise. However, for a system whose phase noise is dominated by the additive noise, that algorithm might be inferior to some other algorithms in terms of the obtained bit error rate (BER). To address this problem, PE 330 utilizes an algorithm that can be adjusted to provide good system performance for different and/or variable phase-noise conditions corresponding to different relative contributions into the total phase noise of the linewidth-related phase noise and the additive noise.

For each time slot, PE 330 is configured to calculate function s(n) recursively defined as follows:

$$s(n) = y^4(n) + \alpha s(n-1) \quad (6)$$

where y(n) is defined in Eq. (4) and $\alpha$ is a recursive memory factor, which can have any selected value between 0 and 1. After calculating s(n), PE 330 calculates the angular component $\psi(n)$ of s(n), which can be expressed as follows:

$$\psi(n) \equiv \angle s(n) = 4\Phi_W(n) - 2l(n)\pi + \xi(n) + \xi'(n) \quad (7)$$

where l(n) is an integer, and $\xi(n)$ and $\xi'(n)$ are expressed by Eqs. (8a-b):

$$\xi(n) = \tan^{-1}\left\{\frac{4\beta_N(n)\sin[\delta_N(n) - \Phi_W(n) - \theta_B(n)]}{1 + 4\beta_N(n)\cos[\delta_N(n) - \Phi_W(n) - \theta_B(n)]}\right\} \quad (8a)$$

$$\xi'(n) = \tan^{-1}\left\{\frac{\kappa(n)\sin[\psi(n-1) - 4\Phi_W(n) - \xi(n)]}{1 + \kappa(n)\cos[\psi(n-1) - 4\Phi_W(n) - \xi(n)]}\right\} \quad (8b)$$

with $\beta_N(n)$ and $\delta_N(n)$ being the amplitude and phase, respectively, of the additive noise defined by Eq. (8a-i):

$$N(n) = \beta_N(n)e^{j\delta_N(n)} \quad (8a\text{-}i)$$

and $\kappa(n)$ defined by Eq. (8b-i):

$$\kappa(n) = \alpha|s(n-1)|/r_0^4 \quad (8b\text{-}i)$$

After calculating $\psi(n)$, PE 330 estimates the value of $\theta_B(n)$ as follows:

$$\hat{\theta}^{(R)}(n) = \angle y(n) - \psi(n)/4 \quad (9)$$

where $\hat{\theta}^{(R)}(n)$ is the estimated value of $\theta_B(n)$, and $\angle y(n)$ denotes the angular component of y(n). Finally, PE 330 applies the value of $\hat{\theta}^{(R)}(n)$ as output signal 332 to slicer 340.

Given the above described processing carried out in PE 330, the error probability for the n-th symbol transition ($P_e^{(R)}(n)$), i.e., the probability of decoding signal 312 to incorrectly determine the corresponding symbol transition in signal 218 (see FIG. 2), equals the probability for value $\rho(n)$ to be greater than $\pi/4$ as expressed by Eq. (10):

$$P_e^{(R)}(n) = Pr\{\rho(n) > \pi/4\} \quad (10)$$

where Pr{argument} denotes a function returning the probability value for the "argument" to be true, and $\rho(n) \equiv |[\hat{\theta}^{(R)}(n) - \theta_B(n)] - [\hat{\theta}^{(R)}(n-1) - \theta_B(n-1)]|$. Using Eqs. (4) and (6-9), Eq. (10) can be transformed into Eq. (11):

$$P_e^{(R)}(n) = Pr\{|\text{round}\{2\phi'(n)/\pi + f_\alpha(n)\} - f_\alpha(n)| > \frac{1}{2}\} \quad (11)$$

where round{argument} denotes a function that rounds a real value of the "argument" to the nearest integer value, and $\phi'(n)$ and $f_\alpha(n)$ are expressed by Eqs. (12a-b):

$$\phi'(n) = \phi(n) + |\xi(n-1)|/4 \quad (12a)$$

$$f_\alpha(n) = (\xi'(n) - \xi'(n-1))/(2\pi) \quad (12b)$$

with $\phi(n)$ defined by Eq. (12a-i):

$$r_0 e^{j\theta_B(n)} = 1 + \beta_0(n)e^{j\phi(n)} \quad (12a\text{-}i)$$

Inspection of Eq. (11) and its constituents reveals that error probability $P_e^{(R)}(n)$ is a function of $\alpha$ and the above-specified noise sources, which are ultimately represented in Eq. (11) by $\Phi_W(n)$, $\beta_N(n)$, and $\delta_N(n)$. Assuming that, for a given set of operating conditions, the latter three values are substantially fixed, it follows then that the value of $P_e^{(R)}(n)$ can be minimized by appropriately adjusting the value of $\alpha$. For example, when the phase noise is substantially dominated by the linewidth-related phase noise, the minimum of $P_e^{(R)}(n)$ corresponds to a relatively small value of $\alpha$, e.g., $|\alpha|<0.2$. In one extreme case, when $\alpha=0$, the above-described recursive phase estimation approach is similar to the single-sample phase estimation approach described, e.g., in "Data Communications Principles," by Gitlin, R. D., Hayes, J. F., and Weinstein, S. B., Plenum Press, 1992, New York, and "Simulation of Communication Systems," by Jeruchim, M. C., Balaban, P., and Shanmugan, K. S., Plenum Press, 1992, New York. Alternatively, when the phase noise is substantially dominated by the additive-noise related phase noise, the minimum of $P_e^{(R)}(n)$ corresponds to a relatively large value of $\alpha$, e.g., $|\alpha|>0.8$. Thus, system 200 having DP 350 is capable of optimizing its performance (e.g., minimizing the BER) under different operating conditions by selecting an appropriate value of $\alpha$. As such, unlike the prior-art systems employing two or more different phase-estimation algorithms, with each algorithm adapted for providing good performance only over a specific relatively narrow range of operating conditions, system 200 having DP 350 can advantageously maintain optimal performance using a single phase-estimation algorithm.

Figure 4:
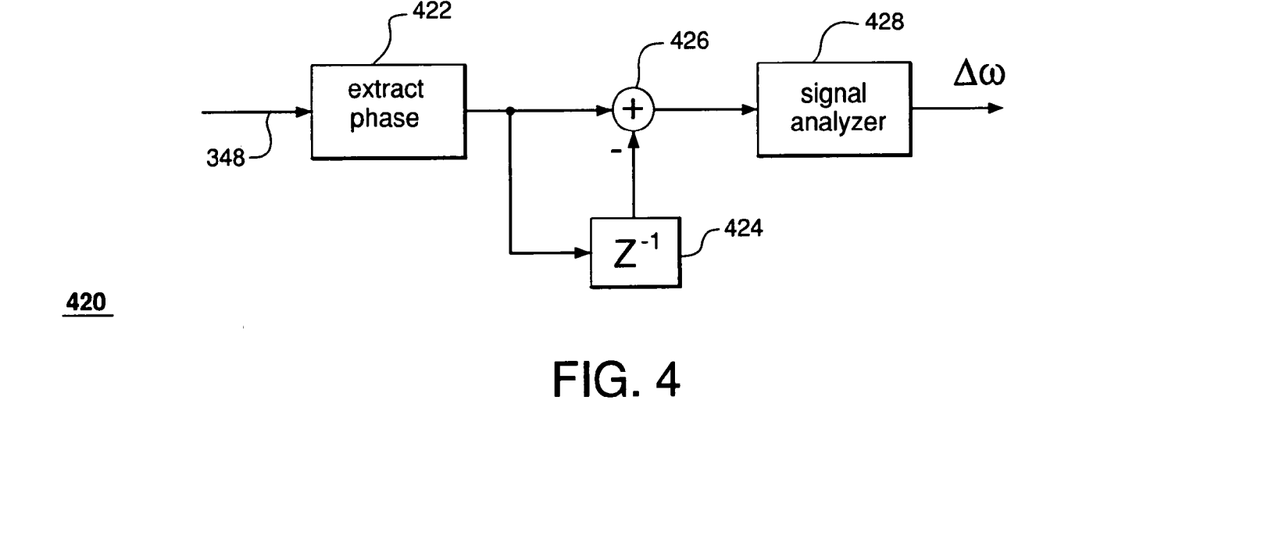
FIG. 4 shows a block diagram of a frequency offset estimator (FOE) that can be used in the DP of FIG. 3 according to one embodiment of the invention.

FIG. 4 shows a block diagram of a frequency offset estimator (FOE) 420 that can be used as FOE 320 according to one embodiment of the invention. FOE 420 has a phase extractor 422 that is configured to compute, for each symbol period, the phase of signal 348, e.g., by (i) presenting the received value of $y_{348}$ in the form given by Eq. (13):

$$y_{348}(t) = r(t)\exp(j\gamma(t)) \quad (13)$$

and (ii) extracting the value of $\gamma(t)$. The extracted value of $\gamma(t)$ is then applied to a delay element ($Z^{-1}$) 424 and an adder 426. Delay element 424 delays the value of $\gamma(t)$ by one symbol period T, multiplies the delayed value by −1, and applies the result to adder 426. Adder 426 then sums the current value $\gamma(t)$ and the negative delayed value $\gamma(t-T)$, thereby computing a phase differential, $d\gamma(n) = \gamma(n) - \gamma(n-1)$, for each symbol transition in signal 348.

The output produced by adder 426 is applied to a signal analyzer 428, which is configured to compute and track the value of $\Delta\omega$. The speed at which signal analyzer 428 computes and updates the value of $\Delta\omega$ is determined by the frequency offset drift rate, $d\Delta\omega/dt$. More specifically, signal analyzer 428 is configured to accumulate a statistically sufficient number (determined by the frequency offset drift rate) of phase differentials $d\gamma(n)$ and determine the value of $\Delta\omega$ under the assumption that, for a sufficiently long pseudo-random bit sequence, the center of the distribution curve for $d\gamma(n)$ is located at $\Delta\omega T$. As such, signal analyzer 428 determines the location of the distribution curve accumulated over an appropriately long time interval and then computes the value of $\Delta\omega$ by dividing the coordinate of the curve's center of mass by T.

When DP 350 is initially brought online, FOE 420 is normally able to produce a first estimate of $\Delta\omega$ after a certain induction period, during which the FOE accumulates the phase-differential statistics. After that initial induction period, FOE 420 can be configured to update the value of $\Delta\omega$ as often as each symbol period using, e.g., a known sliding-window averaging method, in which a fixed number of most-recent phase differentials is used to construct the distribution curve.

In an alternative embodiment, DP 350 can employ an FOE configured to use any other suitable method for the computation of $\Delta\omega$. For example, several suitable methods that can be used to implement FOE 320 can be found in chapter 8 of "Digital Communication Receivers—Synchronization, Channel Estimation, and Signal Processing," by H. Meyr, M. Moeneclaey, and S. A. Fechtel, New York: John Wiley & Sons, 1998. Another suitable method, known by the acronym MUSIC (multiple signal classification), is described, e.g., in "Adaptive Filter Theory," by S. Haykin, 2nd edition, Englewood Cliffs, N.J.: Prentice-Hall, 1991.

Figure 5:
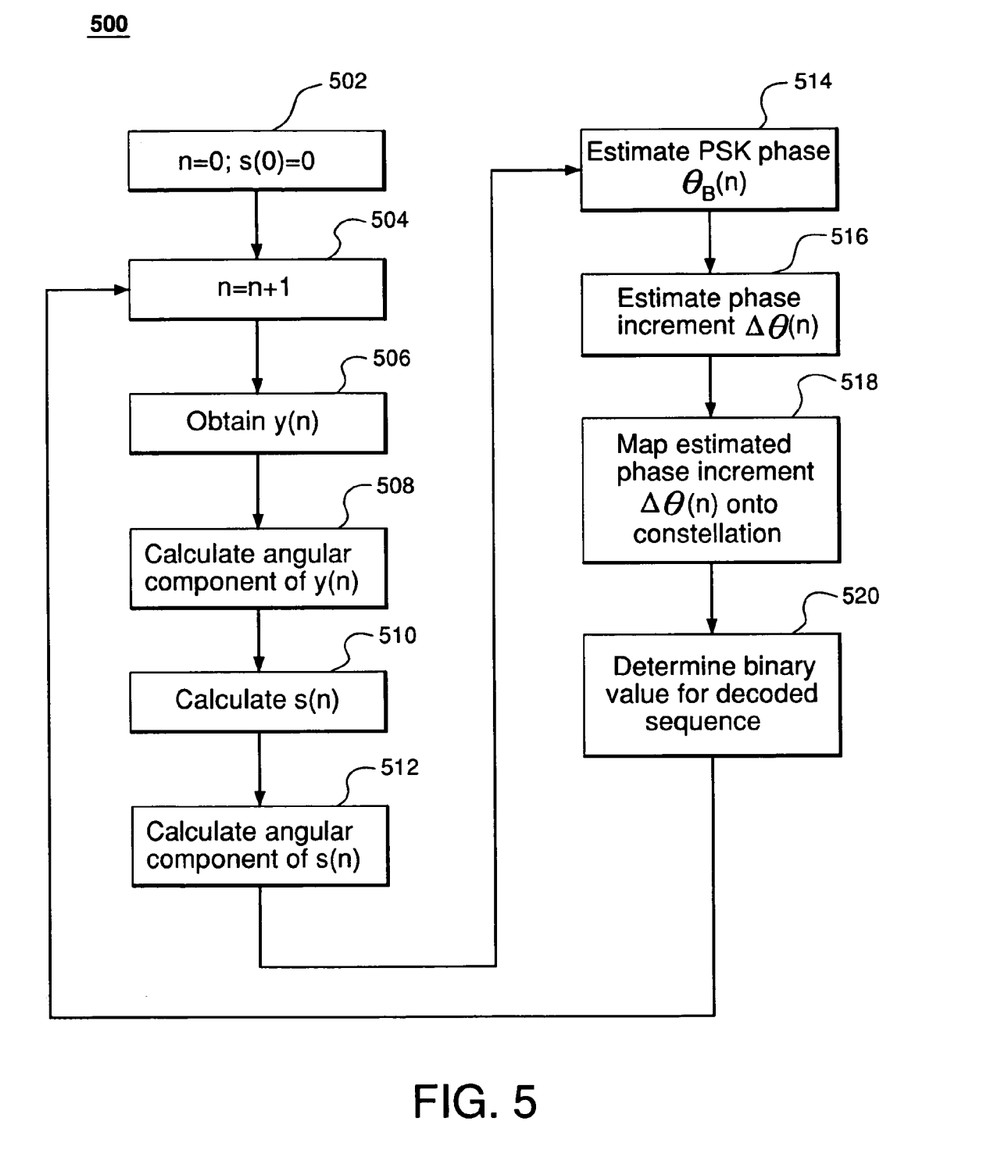
FIG. 5 shows a flowchart of a signal processing method that can be used in the DP of FIG. 3 to decode PSK signals according to one embodiment of the invention.

FIG. 5 shows a flowchart of a signal processing method 500 that can be used in DP 350 to decode PSK signals according to one embodiment of the invention. Method 500 is initialized in step 502, where the value of s(0) is set to zero. The next step of method 500, i.e., step 504, signifies advancement of time to the next time slot. In step 506, the corresponding value of signal $y_{348}(t)$ is processed, e.g., to remove the frequency offset and obtain the value of y(n), e.g., as described above in the context of Eqs. (2-4). The obtained value of y(n) is a complex value, the angular component of which is calculated in step 508. In step 510, the value of s(n) is calculated, e.g., using Eq. (6). Similar to y(n), s(n) is a complex value, the angular component of which is calculated in step 512. In step 514, the value of PSK phase $\theta_B(n)$ is estimated, e.g., using Eq. (9). In step 516, phase increment $\Delta\theta(n)$ is estimated in accordance with Eq. (5). In step 518, the estimated phase increment is mapped onto the corresponding PSK constellation, e.g., the constellation of FIG. 1, to determine the corresponding symbol transition. Finally, in step 520, a binary value corresponding to the determined symbol transition is generated for the respective segment of the decoded data sequence. The processing of steps 506-520 is then repeated for the next time slot, as indicated by the arrow returning the processing of method 500 from step 520 to step 504.

Figure 6:
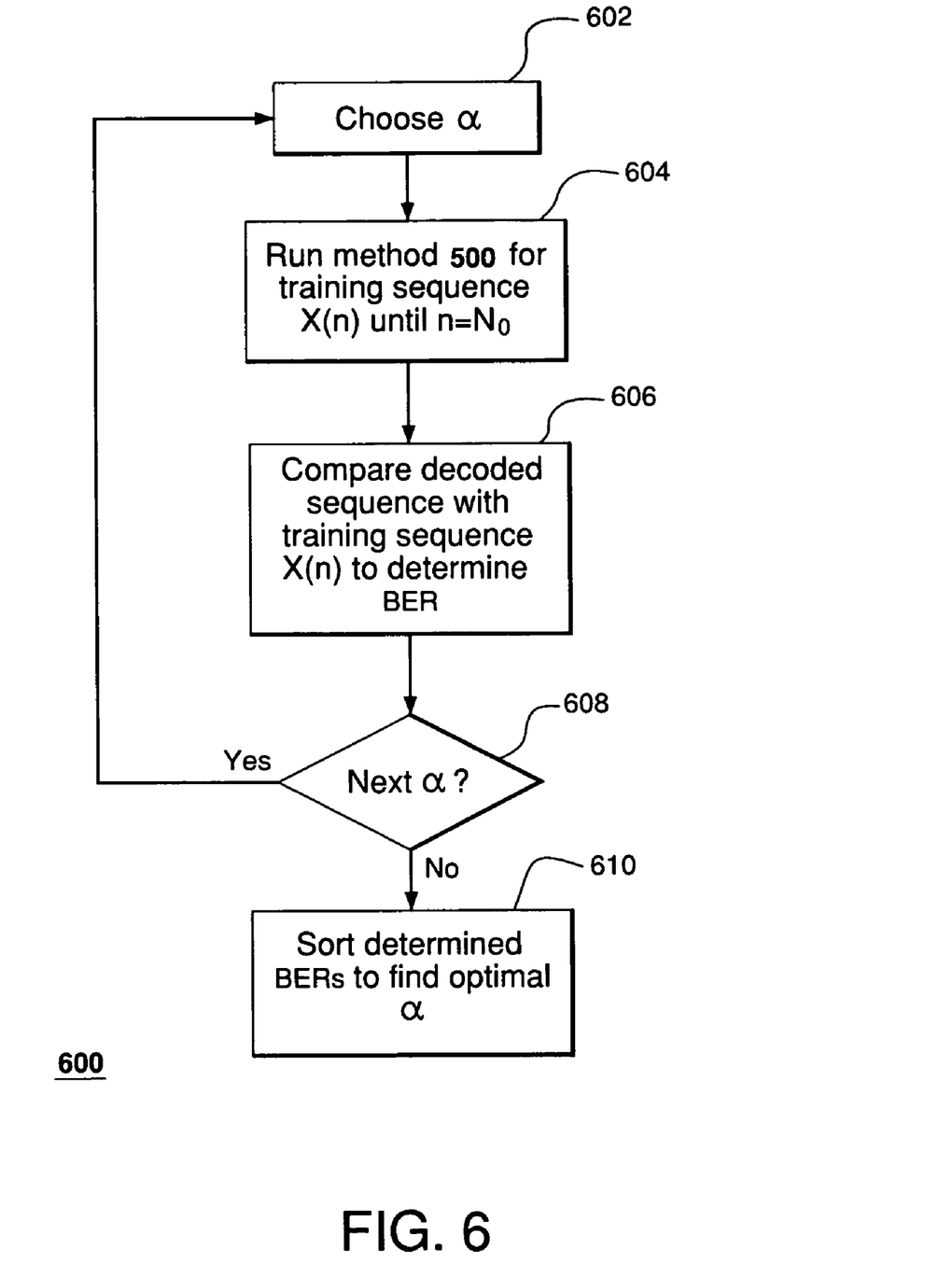
FIG. 6 shows a flowchart of a signal processing method that can be used in the DP of FIG. 3 to determine an optimal value of the recursive memory factor for a given set of operating conditions according to one embodiment of the invention.

FIG. 6 shows a flowchart of a signal processing method 600 that can be used in DP 350 to determine an optimal value of the recursive memory factor $\alpha$ for a given set of operating conditions according to one embodiment of the invention. In step 602, a value of $\alpha$ is chosen for evaluating the performance of DP 350 at that value. In step 604, method 500 of FIG. 5 is run using the value of $\alpha$ chosen in step 602 for processing the signals resulting from the transmission of a training sequence X(n) having $N_0$ symbols (see also FIGS. 2 and 3). In step 606, the decoded sequence produced in step 604 is compared with the training sequence to determine the BER corresponding to the chosen value of $\alpha$. If it is determined in step 608 that further performance evaluation is desired for a different value of $\alpha$, then the processing of method 600 is returned to step 602, where another value of $\alpha$ is selected and set for use in the following step 604. This different value of $\alpha$ can be selected, e.g., based on a sequence of values implementing a scan of a targeted range of values for $\alpha$. Alternatively, if it is determined in step 608 that further performance evaluation is not desired, then the processing of method 600 is directed to step 610, where the previously obtained BER values are sorted to find a value of $\alpha$ corresponding to the lowest BER. The found value of $\alpha$ is deemed to be optimal for the given set of operating conditions. DP 350 is then configured to use that value for decoding further communication signals, which carry unknown (as opposed to known training) data sequences. In one configuration, DP 350 runs method 600 on a periodic basis to select a value of $\alpha$ that is optimal for the current set of operating conditions.

Although signal processing in system 200 is described above with reference to QPSK modulation, one skilled in the art will appreciate that embodiments of the invention are not so limited. More specifically, the above-described phase estimation algorithm can be modified, for example, as follows to apply to general M-th order PSK (M-PSK) modulation.

An M-PSK constellation has M symbols $A_i$ described by Eq. (14):

$$A_i = \exp(2\pi j i/M) \tag{14}$$

where i=0, 1, . . . M−1. The value of M is usually chosen to be $2^K$, where K is an integer. Description of several M-PSK constellations that can be used in system 200 can be found, e.g., in the above-cited U.S. patent application Ser. No. 11/204,607. Note that the QPSK constellation of FIG. 1 corresponds to M=4 (or K=2). For general M-PSK, instead of function s(n) recursively defined by Eq. (6), PE 330 is configured to calculate function s(n) recursively defined by Eq. (15):

$$s(n) = y^M(n) + \alpha s(n-1) \tag{15}$$

With this substitution, PE 330 can then be configured to run methods 500 and 600 substantially as described above to process M-PSK communication signals.

Figure 7:
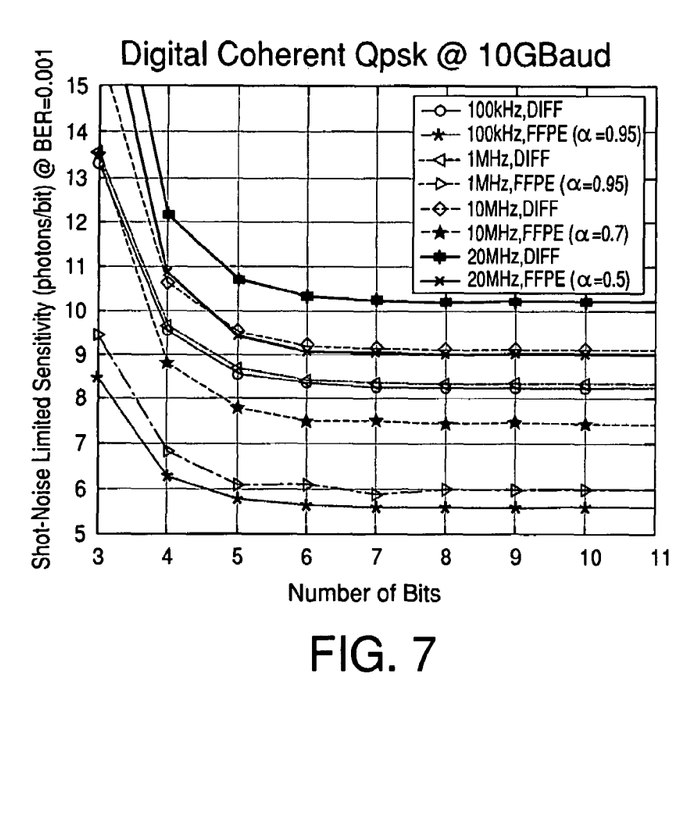
FIG. 7 graphically illustrates the performance of the system of FIG. 2 using two different phase-estimation algorithms.

FIG. 7 graphically illustrates the performance of system 200 configured to transmit QPSK signals at a data transmission rate of 10 GBaud while using two different phase-estimation algorithms. More specifically, the first algorithm (denoted in the figure legend as DIFF) is similar to that disclosed in the above-cited U.S. patent application Ser. No. 11/204,607, and the second algorithm (denoted in the figure legend as FFPE) is that corresponding to methods 500 and 600 (see FIGS. 5 and 6). Under the operating conditions corresponding to FIG. 7, the additive noise is dominated by shot noise (which is a particular component of the additive noise). The horizontal axis in FIG. 7 represents the number of quantization bits at BER=$10^{-3}$, and the vertical axis represents the shot-noise limited sensitivity at that BER. The performance of system 200 employing the two above-specified algorithms is compared at four different laser-linewidth values (0.1, 1, 10, and 20 MHz), which are indicated in the figure legend. The $\alpha$ values used in the second algorithm are given in the figure legend in parentheses, with each of these $\alpha$ values being an optimal value determined using method 600. As evident from the data of FIG. 7, the second algorithm consistently outperforms the first algorithm by providing better sensitivity for any given number of quantization bits within the range covered by FIG. 7. (Note that, in FIG. 7, lower sensitivity values are advantageous and, as such, represent better sensitivity.)

Figure 8:
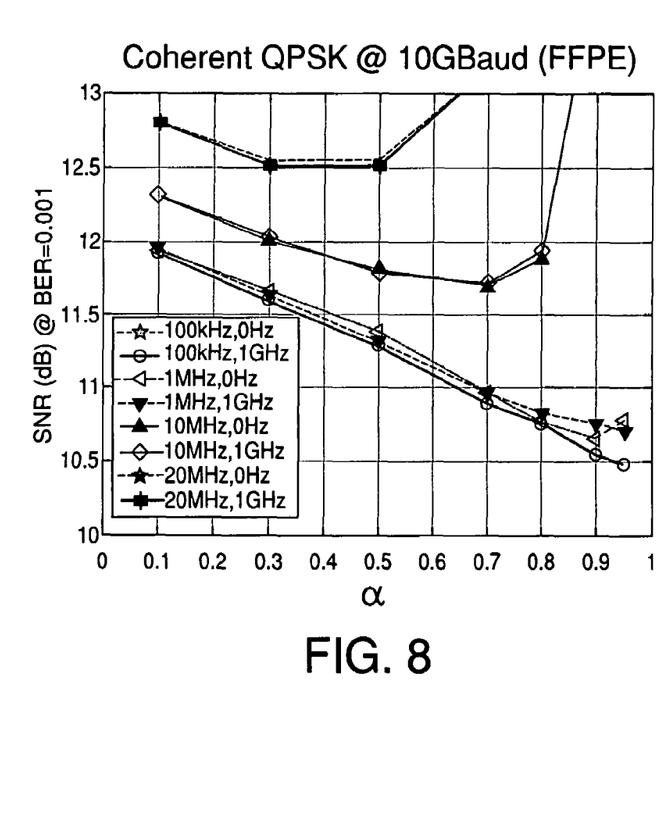
FIG. 8 graphically illustrates the performance of the system of FIG. 2 using the methods of FIGS. 5 and 6.

FIG. 8 graphically illustrates the performance of system 200 configured to transmit QPSK signals at a data transmission rate of 10 GBaud while using methods 500 and 600. The horizontal axis in FIG. 8 represents $\alpha$, and the vertical axis represents the signal-to-noise ratio (SNR) at BER=$10^{-3}$. Of the two values given in the figure legend for each curve, the first value represents the laser linewidth, and the second value represents the frequency offset $\Delta\omega = \omega_{LO} - \omega_S$. First, the data of FIG. 8 clearly show that method 500 appropriately performs frequency-offset correction because the SNR values substantially do not depend on the frequency offset, with all other parameters being fixed. In addition, the data of FIG. 8 show that an optimal value of $\alpha$ can generally be found for each given linewidth value. For example, for a linewidth value of 20 MHz, an optimal value of $\alpha$ lies in the range between about 0.3 and 0.5. Similarly, for a linewidth value of 1 MHz, an optimal value of $\alpha$ is about 0.9.

While this invention has been described with reference to illustrative embodiments, this description is not intended to be construed in a limiting sense. Although certain embodiments of the invention have been described in reference to optical PSK signals, they can similarly be used for electrical and/or wireless radio-frequency PSK signals. Various modifications of the described embodiments, as well as other embodiments of the invention, which are apparent to persons skilled in the art to which the invention pertains are deemed to lie within the principle and scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Embodiments of the present invention may be implemented as circuit-based processes, including possible implementation on a single integrated circuit. As would be apparent to one skilled in the art, various functions of circuit elements may also be implemented as processing steps in a software program. Such software may be employed in, for example, a programmable digital signal processor, micro-controller, or general-purpose computer.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

I claim:

1. A receiver for a phase-shift-keying (PSK) signal, comprising:
   a detector adapted to mix said PSK signal with a local oscillator (LO) signal to produce a digital measure of the PSK signal; and
   a digital processor being coupled to receive the digital measure from the detector and being adapted to process the digital measure to recover data encoded in the PSK signal by measuring time-varying phase offset between a carrier frequency of the PSK signal and the LO signal, wherein:
   for each time slot of the PSK signal, the digital processor is adapted to estimate the phase of a respective PSK constellation symbol based on (i) an angular component of the digital measure and (ii) an angular component of a recursive function, said recursive function having a first component calculated based on the digital measure for the current time slot and a second component calculated based on the digital measure for a preceding time slot and weighted by a recursive memory factor.

2. The invention of claim 1, wherein the digital processor is adapted to recover data encoded using transitions between symbols of a PSK constellation.

3. The invention of claim 1, wherein:
   the digital processor is adapted to estimate a frequency offset corresponding to the time-varying phase offset and substantially remove from the angular component of the digital measure a component corresponding to the frequency offset to generate a frequency-offset-adjusted signal.

4. The invention of claim 3, wherein:
   for each time slot of the PSK signal, the digital processor is adapted to estimate the phase of the respective PSK constellation symbol based on an angular component of the frequency-offset-adjusted signal, wherein the first component is calculated based on the frequency-offset-adjusted signal for the current time slot and the second component is calculated based on the frequency-offset-adjusted signal for the preceding time slot.

5. The invention of claim 1, wherein:
   the digital processor is further adapted to select a value of the recursive memory factor corresponding to an optimal bit error rate (BER).

6. The invention of claim 4, wherein the recursive function, s(n), is calculated as:

$$s(n)=y^M(n)+\alpha s(n-1)$$

where n is a time-slot index, M is a PSK constellation order, y(n) is the frequency-offset-adjusted signal, and α is the recursive memory factor.

7. The invention of claim 1, wherein the digital processor comprises:
   a frequency offset adjustor (FOA) adapted to substantially remove from the angular component of the digital measure a component corresponding to a frequency offset between the carrier frequency of the PSK signal and the LO signal to generate a frequency-offset-adjusted signal;
   a phase estimator operationally coupled to the FOE and adapted to estimate the phase of the respective PSK constellation symbol based on (i) an angular component of the frequency-offset-adjusted signal and (ii) the angular component of the recursive function, wherein the first component is calculated based on the frequency-offset-adjusted signal for the current time slot and the second component is calculated based on the frequency-offset-adjusted signal for the time slot immediately preceding the current time slot;
   a differentiator circuit operationally coupled to the phase estimator and adapted to estimate a phase differential for a PSK-symbol transition based on two different phase estimates generated by the phase estimator; and
   a decoding circuit operationally coupled to the differentiator circuit and adapted to (i) map each estimated phase differential onto a phase increment corresponding to a symbol transition in the PSK constellation and (ii) recover a bit sequence encoded in the PSK signal based on the mapping results.

8. The invention of claim 7, wherein the digital processor further comprises:
   a frequency offset estimator (FOE) operationally coupled to the FOA and adapted to estimate the frequency offset based on phase statistics of the digital measure.

9. The invention of claim 1, wherein the detector comprises:
   a first optical mixer adapted to mix a first copy of the PSK signal with a first copy of the LO signal to produce at least a first interference signal;
   a second optical mixer adapted to mix a second copy of the PSK signal with a second copy of the LO signal to produce at least a second interference signal, wherein the detector is adapted to produce the first and second copies of the LO signal such that said first and second copies are phase-shifted with respect to each other;
   a first signal detector coupled to the first mixer and adapted to measure an intensity of the first interference signal;
   a second signal detector coupled to the second mixer and adapted to measure an intensity of the second interference signal;
   a first analog-to-digital converter (ADC) coupled to at least the first signal detector and adapted to convert the measurement results produced by at least said first signal detector into a first component of the digital measure; and a second ADC coupled to at least the second signal detector and adapted to convert the measurement results produced by at least said second signal detector into the second component of the digital measure.

10. The invention of claim 1, wherein the PSK signal and the LO signal are optical signals.

11. A method of processing a phase-shift-keying (PSK) signal, comprising:
(A) mixing said PSK signal with a local oscillator (LO) signal to produce a digital measure of the PSK signal; and
(B) processing the digital measure to measure time-varying phase offset between a carrier frequency of the PSK signal and the LO signal and recover data encoded in the PSK signal, wherein said processing comprises:
for each time slot of the PSK signal, estimating the phase of a respective PSK constellation symbol based on (i) an angular component of the digital measure and (ii) an angular component of a recursive function, said recursive function having a first component calculated based on the digital measure for the current time slot and a second component calculated based on the digital measure for a preceding time slot and weighted by a recursive memory factor.

12. The invention of claim 11, wherein the step of processing comprises recovering data encoded using transitions between symbols of a PSK constellation.

13. The invention of claim 11, wherein:
the step of processing comprises:
estimating a frequency offset corresponding to the time-varying phase offset; and
substantially removing from the angular component of the digital measure a component corresponding to the frequency offset to generate a frequency-offset-adjusted signal; and
said estimating and removing is performed in a digital processor.

14. The invention of claim 13, wherein the step of processing comprises:
for each time slot of the PSK signal, estimating the phase of the respective PSK constellation symbol based on an angular component of the frequency-offset-adjusted signal, wherein the first component is calculated based on the frequency-offset-adjusted signal for the current time slot and the second component is calculated based on the frequency-offset-adjusted signal for the immediately preceding time slot.

15. The invention of claim 11, wherein the step of processing comprises:
weighting the second component by the recursive memory factor.

16. The invention of claim 15, wherein the step of processing further comprises:
recovering data from the PSK signal using a first selected value of the recursive memory factor, wherein said recovered data correspond to a training data sequence;
determining a BER for the recovered data;
repeating the steps of recovering and determining for one or more other selected values of the recursive memory factor; and
sorting the determined BERs corresponding to different selected values of the recursive memory factor to determine the value corresponding to the optimal BER.

17. The invention of claim 14, wherein the step of processing comprises calculating the recursive function, s(n), as:

$$s(n)=y^M(n)+\alpha s(n-1)$$

where n is a time-slot index, M is a PSK constellation order, y(n) is the frequency-offset-adjusted signal, and $\alpha$ is a the recursive memory factor.

18. The invention of claim 11, wherein the step of processing comprises:
removing from the angular component of the digital measure a component corresponding to a frequency offset between the carrier frequency of the PSK signal and the LO signal to generate a frequency-offset-adjusted signal;
estimating the phase of the respective PSK constellation symbol based on (i) an angular component of the frequency-offset-adjusted signal and (ii) the angular component of the recursive function, wherein the first component is calculated based on the frequency-offset-adjusted signal for a current time slot and the second component is calculated based on the frequency-offset-adjusted signal for the time slot immediately preceding the current time slot;
estimating a phase differential for a PSK-symbol transition based on two consecutive phase estimates;
mapping each estimated phase differential onto one of phase increments corresponding to symbol transitions in the PSK constellation; and
recovering a bit sequence encoded in the PSK signal based on the mapping results.

19. The invention of claim 11, wherein the PSK signal and the LO signal are optical signals.

* * * * *